US011936145B2

(12) United States Patent
Blasick et al.

(10) Patent No.: US 11,936,145 B2
(45) Date of Patent: Mar. 19, 2024

(54) CONTROLLED IMPEDANCE COMPRESSIBLE CONNECTOR

(71) Applicant: TE Connectivity Services GmbH, Schaffhausen (CH)

(72) Inventors: Francis John Blasick, Middletown, PA (US); Denver Harley Wilson, Middletown, PA (US); Keith Edwin Miller, Middletown, PA (US)

(73) Assignee: TE Connectivity Solutions GmbH (CH)

(*) Notice: Subject to any disclaimer, the term of this patent is extended or adjusted under 35 U.S.C. 154(b) by 0 days.

(21) Appl. No.: 17/568,458

(22) Filed: Jan. 4, 2022

(65) Prior Publication Data

US 2023/0216255 A1 Jul. 6, 2023

(51) Int. Cl.

*H01R 24/44* (2011.01)
*H01R 13/631* (2006.01)
*H01R 24/50* (2011.01)

(52) U.S. Cl.

CPC ............. *H01R 24/44* (2013.01); *H01R 24/50* (2013.01); *H01R 13/6315* (2013.01)

(58) Field of Classification Search

CPC ........ H01R 24/44; H01R 12/91; H01R 24/50; H01R 13/6315; H01R 9/05; H01R 24/38

See application file for complete search history.

(56) References Cited

U.S. PATENT DOCUMENTS

| | | | | |
|---|---|---|---|---|
| 9,160,096 | B2 * | 10/2015 | Morley .............. | H01R 13/6477 |
| 9,735,519 | B2 | 8/2017 | Li et al. | |
| 10,498,061 | B1 * | 12/2019 | Blasick ................ | H05K 7/1454 |
| 11,539,167 | B2 * | 12/2022 | Volkov ................... | H01R 13/11 |
| 2018/0131153 | A1 * | 5/2018 | Flaherty, IV ...... | H01R 13/2421 |
| 2021/0143581 | A1 | 5/2021 | Wu et al. | |
| 2021/0399468 | A1 | 12/2021 | Gingrich, III et al. | |

FOREIGN PATENT DOCUMENTS

WO 2010075336 A1 7/2010

OTHER PUBLICATIONS

Extended European Search Report, App. No. 22217342.9-1201 dated May 12, 2023.

* cited by examiner

*Primary Examiner* — Oscar C Jimenez
*Assistant Examiner* — Paul D Baillargeon

(57) ABSTRACT

A controlled impedance compressible electrical connector having a housing with at least one terminal receiving cavity which extends from a first surface of the housing to a second surface of the housing. A terminal assembly is positioned in each of the at least one terminal receiving cavities of the housing. The terminal assembly has a first fixed center terminal, a second movable center terminal, a fixed outer shell, a movable outer shell, and a resilient member. The terminal assembly is configured to allow impedance of the electrical connector to be maintained as the second movable center terminal and the movable outer shell are moved relative to the first fixed center terminal, the fixed outer shell and the housing.

18 Claims, 5 Drawing Sheets

CONTROLLED IMPEDANCE COMPRESSIBLE CONNECTOR

FIELD OF THE INVENTION

The present invention relates to a compressible coaxial connector or adaptor which has controlled impedance. In particular, the invention relates to a compressible coaxial connector or adaptor which maintains favorable impedance while accommodating mating engagement variations between mating substrates.

BACKGROUND OF THE INVENTION

Due to the increasing complexity of electronic components, it is desirable to fit more components in less space on a circuit board or other substrate. Consequently, the spacing between signal traces and contacts within circuit boards has been reduced, while the number of signal traces and contacts housed in the circuit boards has increased, thereby increasing the need for electrical connectors that are capable of handling higher and higher speeds and to do so with greater and greater densities.

Coaxial connectors and adaptors for providing interconnection between two mating connector halves or circuit boards is well known in the industry. Impedance within connectors used in high speed applications must be tightly controlled in order to maintain the integrity of the signal, particularly in miniature RF connectors. Impedance is controlled by maintaining accurate spacing between the inner conductor and the outer shell throughout the connector. As spacing between the two mating connector halves or circuit boards may vary due to manufacturing tolerances and the like, such connectors and adaptors need to be able to accommodate variation in mating distances between the two mating connector halves or circuit boards. Cable attached contacts such as described in U.S. Pat. No. 9,735,519 allow for the contact to absorb the differences in mating distance between the two mating connectors because at least one side is attached to a cable that can move with the spring loaded contact relative to the holding block (or module). For applications where contacts within both mating connectors are connected to substrates, maintaining accurate spacing between the inner and outer conductors (and therefore impedance) across the required mating distance variation becomes difficult.

It would, therefore, be beneficial to provide a coaxial connector or adaptor which is compressible and which enables impedance to be maintained across mating distance variations to stabilize signal integrity of board to board connections.

SUMMARY OF THE INVENTION

An embodiment is directed to a controlled impedance compressible electrical connector having a housing with at least one terminal receiving cavity which extends from a first surface of the housing to a second surface of the housing. A terminal assembly is positioned in each of the at least one terminal receiving cavities of the housing. The terminal assembly has a first fixed center terminal, a second movable center terminal, a fixed outer shell, a movable outer shell, and a resilient member. The terminal assembly is configured to allow impedance of the electrical connector to be maintained as the second movable center terminal and the movable outer shell are moved relative to the first fixed center terminal, the fixed outer shell and the housing.

An embodiment is directed to a controlled impedance compressible electrical connector for providing an electrical connection between a first mating component and a second mating component. The controlled impedance compressible electrical connector has a housing with at least one terminal receiving cavity extending therethrough. A terminal assembly is positioned in the at least one terminal receiving cavity. The terminal assembly includes a fixed center terminal, a movable outer shell, a movable center terminal and a resilient member. The movable outer shell is movable in the at least one terminal receiving cavity and the housing. The movable center terminal extends in the movable outer shell. The movable center terminal moves in unison with the movable outer shell. The relative spacing between the movable center terminal and the movable outer shell is maintained as the movable center terminal and the movable outer shell are moved. The resilient member exerts a biasing force on the movable outer shell. The movement of the movable outer shell and the movable center terminal relative to the fixed center terminal and the housing allows the controlled impedance compressible electrical connector to accommodate spacing variations between the first mating component and the second mating component. The impedance of the electrical connector is maintained as the movable center terminal and the movable outer shell are moved relative to the fixed center terminal and the housing.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
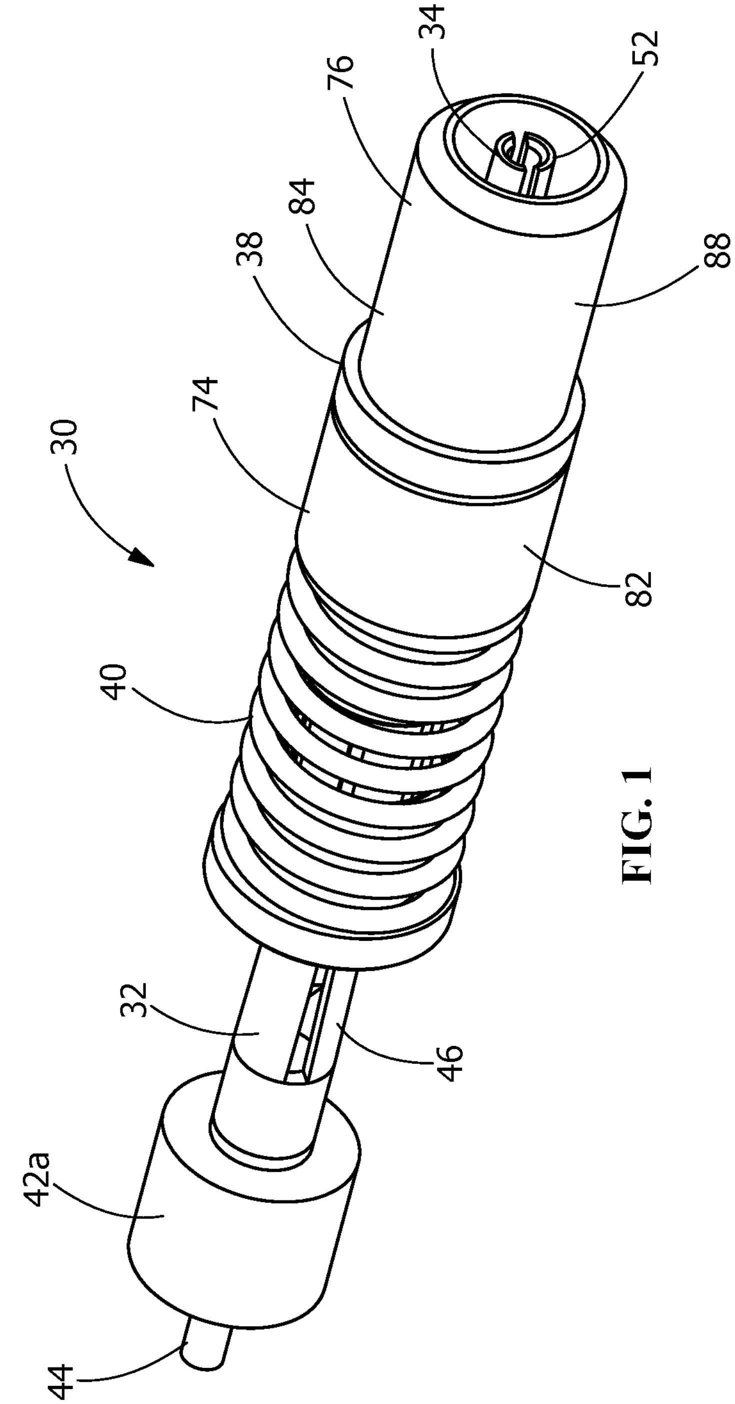
FIG. 1 is a perspective view of an illustrative embodiment of a contact of an adapter for use in the illustrative coaxial connector system.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 3:
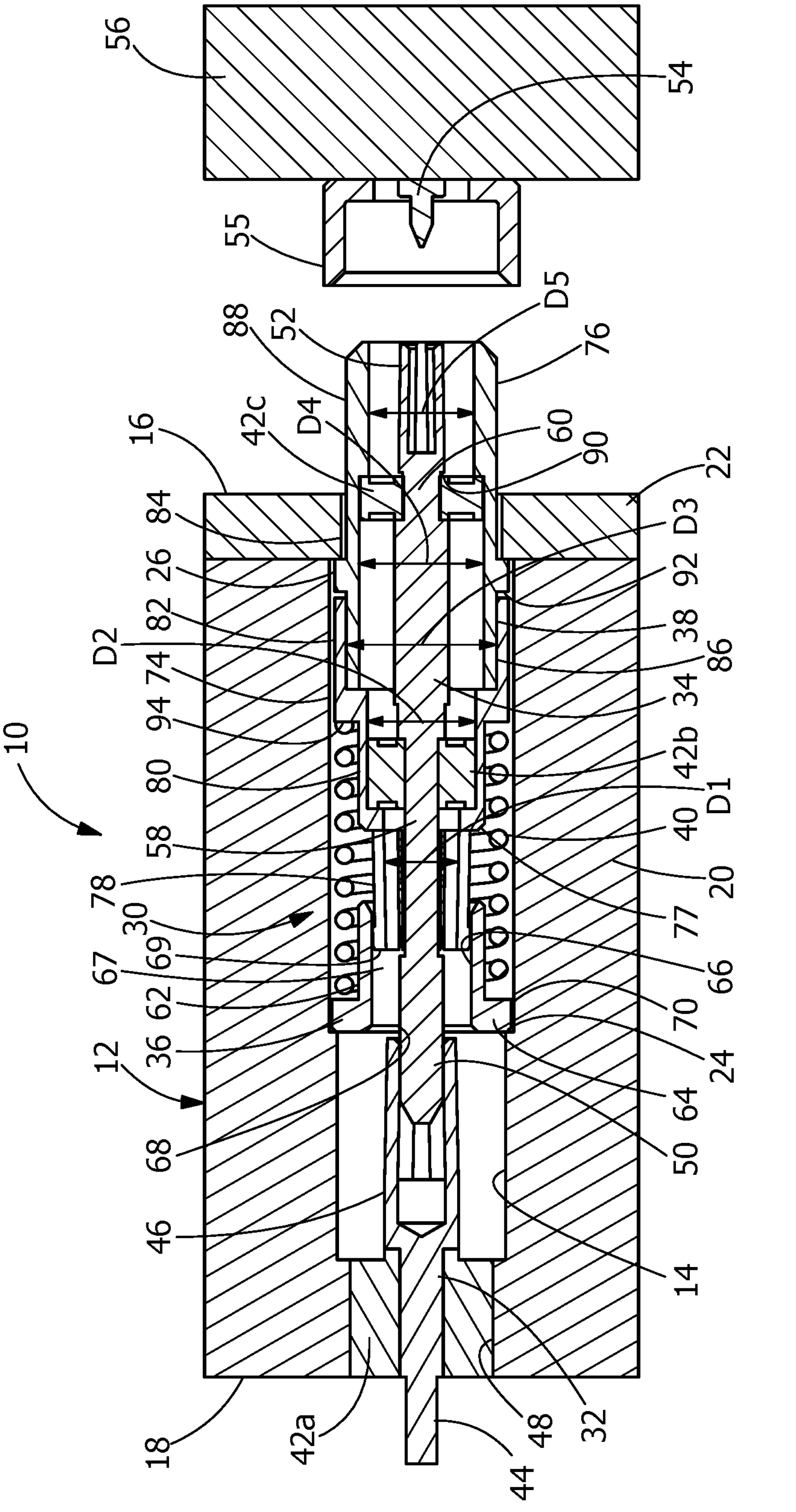
FIG. 3 is a cross-sectional view of the contact positioned in a housing of the adaptor, taken along the center axis of the contact, the contact and adaptor are shown prior to mating with an illustrative fixed substrate.
Figure 4:
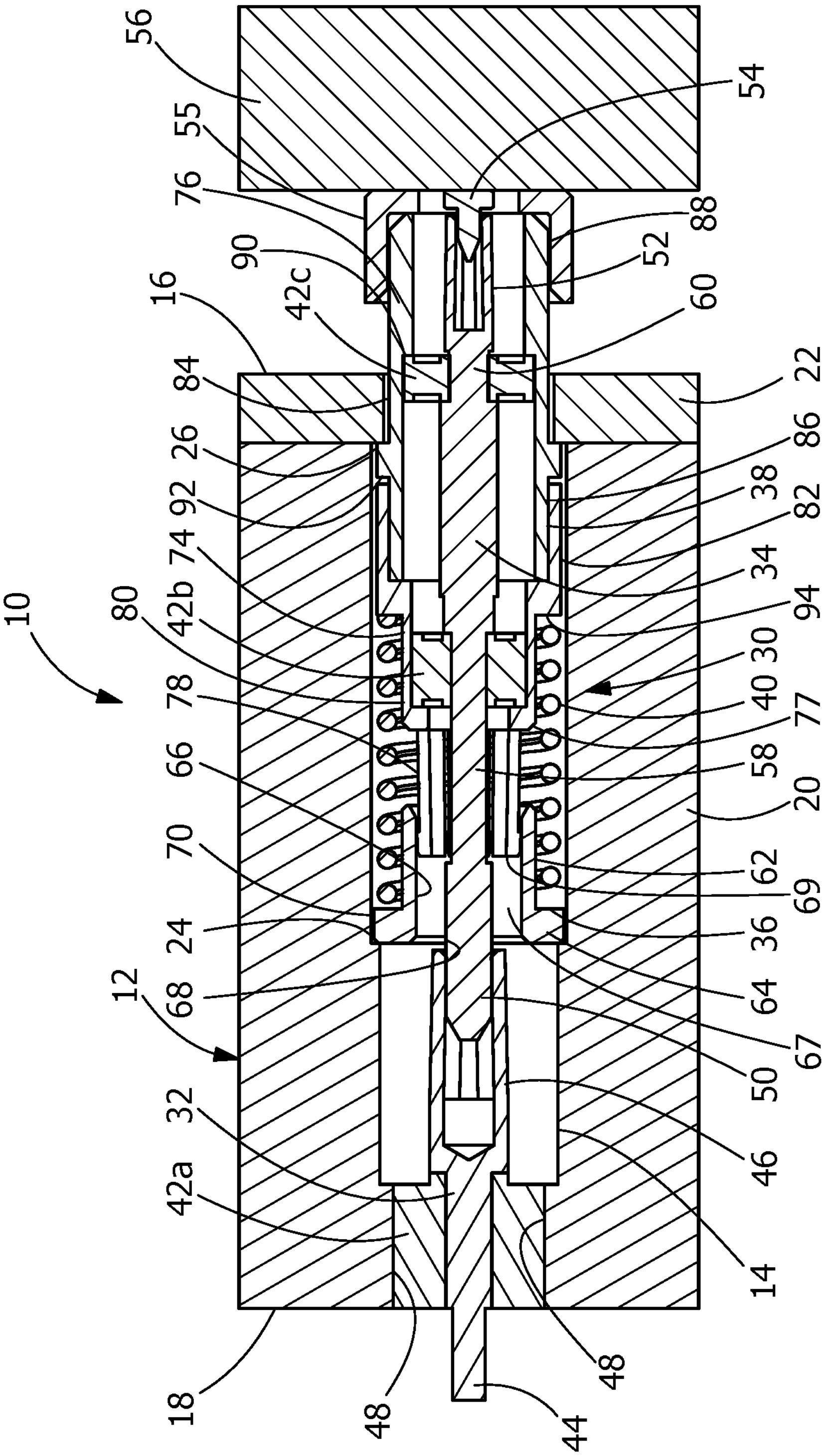
FIG. 4 is a cross-sectional view of the contact, similar to that of FIG. 3, the contact and adaptor are shown partially mated with the illustrative fixed substrate.
Figure 5:
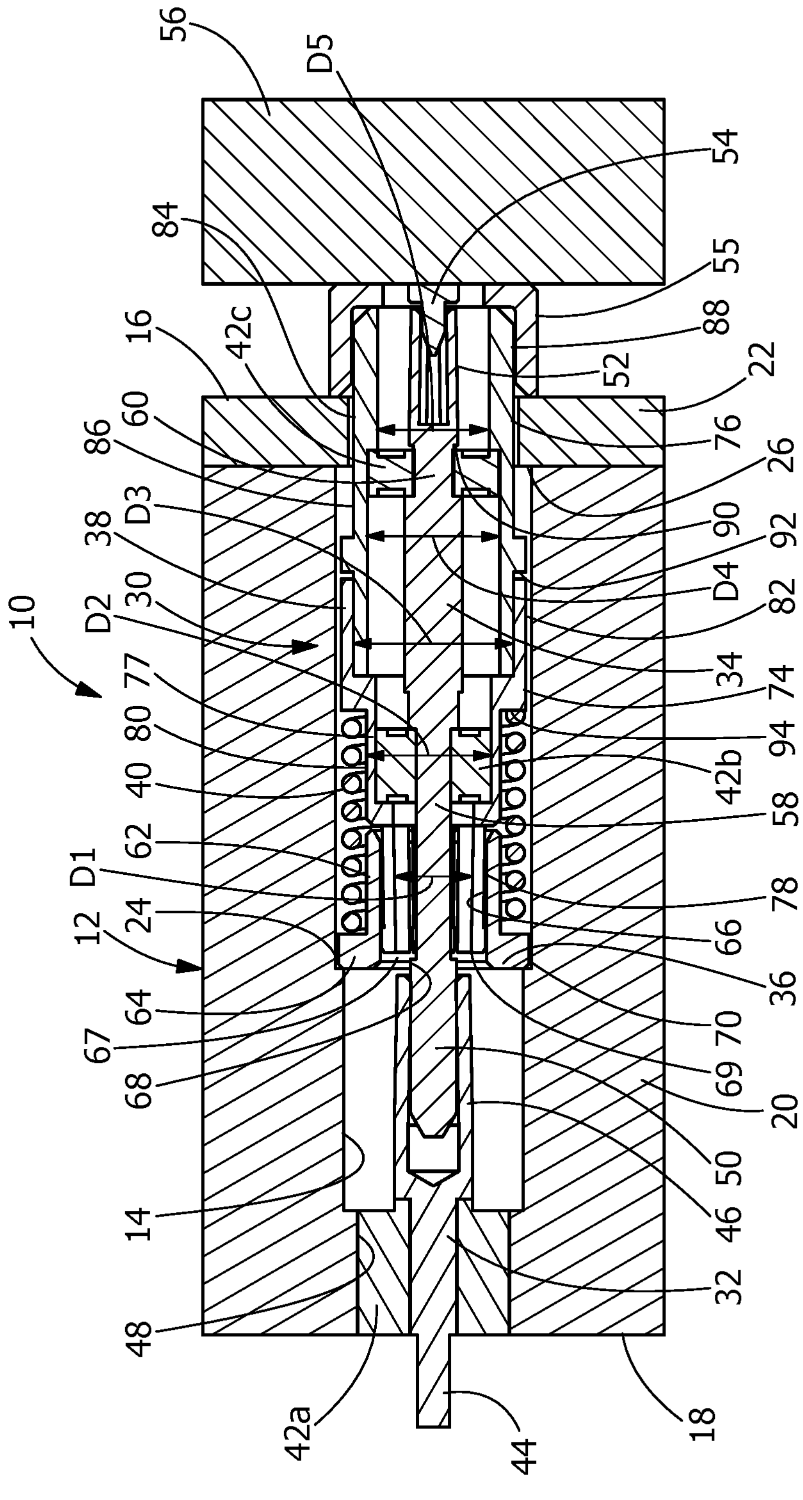
FIG. 5 is a cross-sectional view of the contact, similar to that of FIG. 3, the contact and adaptor are shown fully mated with the illustrative fixed substrate.

An illustrative controlled impedance compressible electrical connector or adaptor 10, as shown in FIGS. 3 through 5, has a housing 12 with at least one terminal receiving cavity 14 which extends from a first surface 16 of the housing 12 to a second surface 18 of the housing 12. In the embodiment shown, the housing 12 is a two piece housing with a main body 20 and a cover 22. However, other configurations of the housing 12, including, but not limited to a one piece housing, may be used.

A first shoulder 24 extends into the terminal receiving cavity 14 from the housing 12. In the illustrative embodiment shown, the first shoulder 24 extends inward about the entire circumference of the terminal receiving cavity 14. However, other configurations of the first shoulder 24 may be used. The first shoulder 24 is positioned between the first surface 16 and the second surface 18.

A second shoulder 26 extends into the terminal receiving cavity 14 from the housing 12. In the illustrative embodiment shown, the second shoulder 26 extends inward about the entire circumference of the terminal receiving cavity 14. However, other configurations of the second shoulder 26 may be used. The second shoulder 26 is positioned between the first surface and the second surface and proximate the first surface 16. In the embodiment shown, the second shoulder 26 is provided on the cover 22 of the housing 12.

Figure 2:
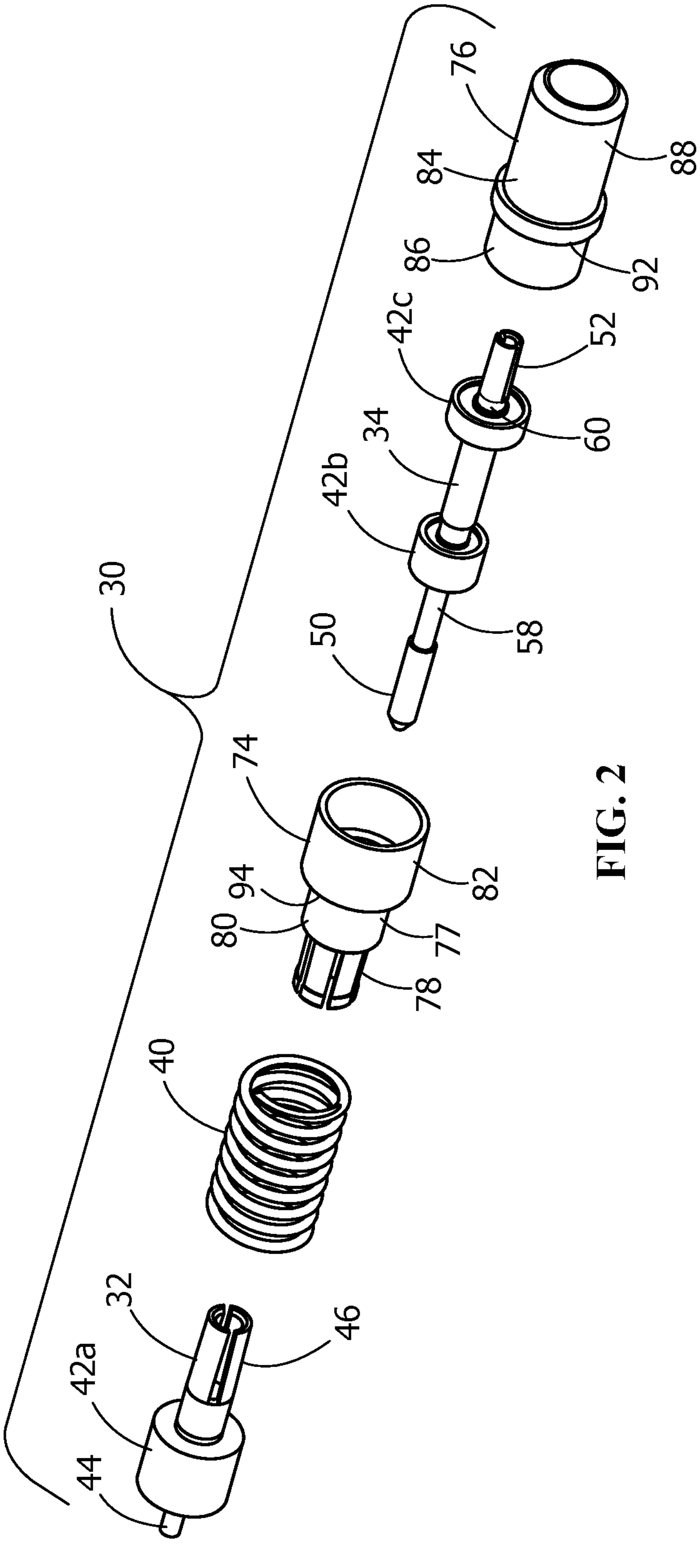
FIG. 2 is an exploded perspective view of the contact of FIG. 1.

A terminal assembly 30 is positioned in each of the at least one terminal receiving cavities 14 of the housing. As shown in FIGS. 1 and 2, each of the terminal assembly 30 includes a first fixed center terminal 32, a second movable center terminal 34, a fixed outer shell 36, a movable outer shell 38, a resilient member or spring 40 and insulators 42.

The first fixed center terminal 32 has a first mating section 44 and a second mating section 46. In the illustrative embodiment shown, the first mating section 44 is a pin and extends from the second surface 18 in a direction away from the first surface 16. The first mating section 44 is configured to make an electrical connection to a substrate (not shown). The second mating section 46 is a female receptacle for receiving an end of the second movable center terminal 34 therein. An insulator 42*a* is positioned between the first mating section 44 and the second mating section 46. The insulator 42*a* extends about the circumference of the first fixed center terminal 32. The insulator 42*a* is dimensioned to extend from the first fixed center terminal 32 to a wall 48 of the terminal receiving cavity 14. The insulator 42*a* properly positions the first fixed center terminal 32 in the terminal receiving cavity 14 and retains the first fixed center terminal 32 therein. In the illustrative embodiment shown, the first fixed center terminal 32 is formed from beryllium copper, but other materials having the appropriate conductive and strength characteristics may be used, such as, but not limited to phosphor bronze. The insulator 42*a* may be made from polytetrafluor oethylene (PTFE) or other materials having the appropriate insulative and strength characteristics.

The second movable center terminal 34 has a first mating section 50 and a second mating section 52. In the illustrative embodiment shown, the first mating section 50 is a pin. The first mating section 50 is configured to make an electrical connection to the second mating section 46 of the first fixed center terminal 32. The second mating section 52 of the second movable center terminal 34 is a female receptacle for receiving an end of a mating contact 54 of a second substrate 56. The second movable center terminal 34 has sections of different diameters including a first reduced diameter section 58 and a second reduced diameter section 60. In the illustrative embodiment shown, the second movable center terminal 34 is formed from beryllium copper, but other materials having the appropriate conductive and strength characteristics may be used, such as, but not limited to phosphor bronze.

A second insulator 42*b* is positioned in the first reduced diameter section 58. The second insulator 42*b* extends about the circumference of the first reduced diameter section 58. The second insulator 42*a* is dimensioned to extend from the second movable center terminal 34 to the movable outer shell 38. The second insulator 42*b* properly positions the second movable center terminal 34 in the movable outer shell 38 and retains the second movable center terminal 34 therein.

A third insulator 42*c* cooperates with the second reduced diameter section 60. The third insulator 42*c* extends about the circumference of the second reduced diameter section 60. The third insulator 42*c* is dimensioned to extend from the second movable center terminal 34 to the movable outer shell 38. The third insulator 42*c* properly positions the second movable center terminal 34 in the movable outer shell 38 and retains the second movable center terminal 34 therein.

The fixed outer shell 36 has a conductive wall 62 and a back wall 64. The conductive wall 62 and a back wall 64 form a first terminal receiving cavity 66. The first terminal receiving cavity 66 is dimensioned to receive the first mating section 50 of the second movable center terminal 34 and a portion of the movable outer shell 38 therein. The back wall 64 has an opening 68 which is dimensioned to allow the first mating section 50 of the second movable center terminal 34 to extend therethrough and mate with the second mating section 46 of the first fixed center terminal 32. A mounting shoulder or projection 70 extends from the conductive wall 62 in a direction away from the first terminal receiving cavity 66. The mounting projection 70 cooperates with the first shoulder 24 of the housing 12 to properly position and secure the fixed outer shell 36 in the terminal receiving cavity 14.

In the illustrative embodiment shown, the movable outer shell 38 includes a first movable outer shell 74 and a second movable outer shell 76. However, other configurations of the movable outer shell 38 may be used. In the illustrative embodiment shown, the first movable outer shell 74 and the second movable outer shell 76 are formed from beryllium copper, but other materials having the appropriate conductive and strength characteristics may be used, such as, but not limited to phosphor bronze.

The first movable outer shell 74 has a tubular configuration with a conductive outer wall 77. The outer wall 77 has a first terminal receiving portion 78 with a first inside diameter of D1, a second terminal receiving portion 80 with a second inside diameter of D2 and a third terminal receiving portion 82 with a third inside diameter D3. The third inside diameter D3 is larger than the second inside diameter D2, and the second inside diameter D2 is larger than the first inside diameter of D1.

The first terminal receiving portion 78 is configured to receive the first reduced diameter section 58 of the second movable center terminal 34. The second terminal receiving portion 80 is configured to receive the first reduced diameter section 58 and the second insulator 42*b*. The second terminal receiving portion 80 cooperates with the second insulator 42*b* to properly position the second movable center terminal 34 in the movable outer shell 38 and retains the second movable center terminal 34 therein. The third terminal receiving section 82 is configured to receive a portion of the second movable outer shell 76 and the second movable center terminal 34.

The second movable outer shell 76 has a tubular configuration with a conductive outer wall 84. The outer wall 84 has a first terminal receiving portion 86 with an inside diameter of D4 and a second terminal receiving portion 88 with an inside diameter of D5. The inside diameter D4 is slightly larger than the inside diameter D5. In the illustrative embodiment shown, the inside diameter D5 is approximately equal to the third inside diameter D2 of the first movable outer shell 74, however, other configurations may be used.

The second terminal receiving portion 88 of the second movable outer shell 76 is configured to receive the second mating section 52 of the second movable center terminal 34. The first terminal receiving portion 86 of the second movable outer shell 76 is configured to receive the portion of the second movable center terminal 34 which is proximate the second mating section 52. The first terminal receiving portion 86 is also configured to receive the third insulator 42*c*. A shoulder 90 of the first terminal receiving portion 86 cooperates with the third insulator 42*c* to properly position the second movable center terminal 34 in the movable outer shell 38 and retains the second movable center terminal 34 therein. The first terminal receiving portion 86 is also configured to be received in the third terminal receiving section 82 of the first moveable outer shell 74. An outer projection or shoulder 92 is provided on the second movable outer shell 76 to facilitate the proper positioning of the second movable outer shell 76 relative to the first movable outer shell 74.

The spring 40 extends between the fixed outer shell 36 and the movable outer shell 74. In the embodiment shown, the spring 40 extends between the mounting projection 70 of the fixed outer shell 36 and a shoulder 94 of the first movable outer shell 74 of the movable outer shell 38.

Prior to mating with a mating connector or substrate 56, the connector or adaptor 10 is in the position shown in FIG. 3. In this position, the first mating section 44 of the first fixed center terminal 32 extends beyond the second surface 18 of the housing 12. The second terminal receiving portion 88 of the second movable outer shell 76 and the second mating section 52 of the second movable center terminal 34 extend beyond the first surface 18 of the housing 12. While, in this embodiment, the first mating section 44 of the first fixed center terminal 32 extends beyond the second surface 18 of the housing 12, the first mating section 44 other configurations may be used, such as for a surface mount application.

In the position shown in FIG. 3, an end portion of the first mating section 50 of the second movable center terminal 34 is positioned in the second mating section 46 of the first fixed center terminal 32. The remainder of the first mating section 50 is positioned in the terminal receiving cavity 66 of the fixed outer shell 36. An end portion of the first terminal receiving portion 78 of the first movable outer shell 74 of the movable outer shell 38 is also positioned in the terminal receiving cavity 66 of the fixed outer shell 36.

In this position, the spring 40 is maintained in a slightly compressed position. Consequently, the spring 40 exerts a force on the mounting projection 70 to bias that fixed outer shell 36 against the first shoulder 24 of the housing 10. In addition, the spring 40 exerts a force on the shoulder 94 of the first movable outer shell 74 of the movable outer shell 38 to bias the projection 92 of the second movable outer shell 76 against the second shoulder 26 of the housing. In so doing, the terminal assembly 30 is maintained in its initial or unmated position by the force of the spring 40. In the initial or unmated position, a space or pocket 67 is provided in the terminal receiving cavity 66 between the first shoulder 24 of the housing 12 and the free end 69 of the conductive outer wall 77 of the first movable outer shell 74.

As the adaptor 10 and terminal assembly 30 are moved into engagement with the second substrate 56, the second terminal receiving portion 88 of the second movable outer shell 76 is moved into engagement with an outer shell 55 on the second substrate 56, as shown in FIG. 4. In addition, the second mating section 52 of the second movable center terminal 34 is moved into engagement with the mating contact 54 of the second substate 56. In so doing, a coaxial electrical connection is established between the substrate 56 and the adaptor 10.

When fully inserted, as shown in FIG. 5, the second terminal receiving portion 88 of the second movable outer shell 76 and the second mating section 52 of the second movable center terminal 34 are forced to move inward toward the second surface 18 of the housing 12. As this occurs, the entire terminal assembly 30 is moved from the position shown in FIG. 3 toward the second surface 18 of the housing 12, as shown in FIG. 5.

As the terminal assembly 30 is moved to the position shown in FIG. 5, the fixed outer shell 36 and the first fixed center terminal 32 remains stationary and does not move. However, the remainder of the terminal assembly 30, including the second movable terminal 38, the first movable outer shell 74 and the second movable outer shell 76 move in unison. Consequently, the positioning and spacing of the second movable center terminal 34 relative to the first movable outer shell 74 and the second movable outer shell 76 does not change as the terminal assembly 30 is moved or slid in the terminal receiving cavity 14. This allows the impedance of the terminal assembly 30 to be properly controlled and maintained as the adaptor 10 is mated to the mating connector or substrates.

In particular, as the terminal assembly 30 is moved from the first position shown in FIG. 3 to the second position shown in FIG. 5: the positioning and spacing of the reduced diameter section 58 of the second movable center terminal 34 is maintained relative to the first terminal receiving portion 78 of the first movable outer shell 74; the positioning and spacing of the reduced diameter section 58 of the second movable center terminal 34 and the second insulator 42*b* is maintained relative to the second terminal receiving portion 80 of the first movable outer shell 74; the positioning and spacing of the second mating section 52 of the second movable center terminal 34 is maintained relative to the second terminal receiving portion 88 of the second movable outer shell 76; and the positioning and spacing of the portion of the second movable center terminal 34 which is proximate the second mating section 52 and the third insulator 42*c* is maintained relative to the second terminal receiving portion 88 of the second movable outer shell 76.

The configuration of, and particularly the spacing of: the reduced diameter section 58 of the second movable center terminal 34 in the first terminal receiving portion 78 of the first movable outer shell 74; the reduced diameter section 58 of the second movable center terminal 34 and the second insulator **42*b* in the second terminal receiving portion 80 of the first movable outer shell 74; the second mating section 52 of the second movable center terminal 34 in the second terminal receiving portion 88 of the second movable outer shell 76; and the second movable center terminal 34 which is proximate the second mating section 52 and the third insulator 42*c* in the second terminal receiving portion 88 of the second movable outer shell 76 are calculated such that the impedance in each of these sections matches the impedance in each of the other sections. This allows the signals to be transmitted across each of the sections and across the terminal assembly 30** with little or no loss in signal integrity.

During movement of the terminal assembly 30 from the first position shown in FIG. 3 to the second position shown in FIG. 5, the first mating section 50 of the second movable center terminal 34 is moved from the first terminal receiving cavity 66 of the fixed outer shell 36 into the second mating section 46 of the first fixed center terminal 32. As this occurs, the space or pocket 67 is reduced in size as the free end 69 of the conductive outer wall 77 is moved toward the first shoulder 24 of the housing 12. The first terminal receiving cavity 66 of the fixed outer shell 36 and the second mating section 46 of the first fixed center terminal 32 are configured such that the impedance in these section is matched as the movement occurs. This allows the signals to be transmitted across these sections with little or no loss in signal integrity.

As the terminal assembly 30 is moved from the first position shown in FIG. 3 to the second position shown in FIG. 5, the spring 40 is further compressed. Consequently, when the adaptor 10 is moved from the second substrate 56, the spring 40 will return toward and unstressed position, thereby exerting a force on the shoulder 94 of the first movable outer shell 74 of the movable outer shell 38, causing the first movable outer shell 74 and the terminal assembly 30 to move back to the initial or unmated position shown in FIG. 3. In this position, the shoulder 94 of the first movable outer shell 74 of the movable outer shell 38 abuts the second shoulder 26 of the housing 12. Also in this position, the mounting projection 70 cooperates with the first shoulder 24 of the housing 12 to properly position and secure the fixed outer shell 36 in the terminal receiving cavity 14.

In addition, the use of the movable terminal assembly 30 with the biasing spring 40 allows for the adaptor 10 and terminal assembly 30 to provide a controlled and favorable impedance between mating connectors or substrates even when there are mating engagement variations between mating substrates due to manufacturing tolerances and the like. As the terminal assembly 30 is configured to move as described above, the impedance of the terminal assembly 30 is controlled regardless of the distance that the first mating section 50 of the second movable center terminal 34 is moved into the second mating section 46 of the first fixed center terminal 32. As the first movable outer shell 74, the second movable outer shell 76 and the second movable center terminal 34 are moved in unison, and as the spacing between the components is maintained regardless of the position in the terminal receiving cavity 14, the impedance is consistently maintained regardless of the position. This allows the adaptor 10 and movable terminal assembly 30 to accommodate variations in mating distance between the two mating connectors or substrates because of manufacturing tolerances in the connectors/substrates and the systems in which they are used. The impedance is controlled in the present invention by maintaining accurate spacing between the inner fixed center conductor or terminal 32, the inner movable center conductor or terminal 34, the fixed outer shell 34 and the movable outer shell 36 throughout the connector.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A controlled impedance compressible electrical connector comprising:

a housing with at least one terminal receiving cavity extending from a first surface of the housing to a second surface of the housing;

a terminal assembly positioned in each of the at least one terminal receiving cavities of the housing, the terminal assembly having a first fixed center terminal, a second movable center terminal, a fixed outer shell, a movable outer shell, and a resilient member;

the second movable center terminal has sections of different diameters including a first reduced diameter section and a second reduced diameter section;

a first insulator cooperates with the first reduced diameter section, the first insulator extends about the circumference of the first reduced diameter section and is dimensioned to extend from the second movable center terminal to the movable outer shell, the first insulator positions the second movable center terminal in the movable outer shell and retains the second movable center terminal therein;

a second insulator cooperates with the second reduced diameter section, the second insulator extends about the circumference of the second reduced diameter section and is dimensioned to extend from the second movable center terminal to the movable outer shell, the second insulator positions the second movable center terminal in the movable outer shell and retains the second movable center terminal therein;

wherein the terminal assembly is configured to allow impedance of the electrical connector to be maintained as the second movable center terminal and the movable outer shell are moved relative to the first fixed center terminal, the fixed outer shell and the housing.

2. The controlled impedance compressible electrical connector as recited in claim 1, wherein the housing is a two piece housing with a main body and a cover.

3. The controlled impedance compressible electrical connector as recited in claim 1, wherein a first shoulder extends into the terminal receiving cavity from the housing, the first shoulder is positioned between the first surface and the second surface.

4. The controlled impedance compressible electrical connector as recited in claim 3, wherein a second shoulder extends into the terminal receiving cavity from the housing, the second shoulder is positioned between the first surface and the second surface and proximate the first surface.

5. The controlled impedance compressible electrical connector as recited in claim 1, wherein the first fixed center terminal has a first mating section and a second mating section.

6. The controlled impedance compressible electrical connector as recited in claim 5, wherein the first mating section of the first fixed center terminal is a pin which extends from the second surface of the housing in a direction away from the first surface of the housing, the second mating section of the first fixed center terminal is a female receptacle for receiving an end of the second movable center terminal therein.

7. The controlled impedance compressible electrical connector as recited in claim 6, wherein a third insulator is positioned between the first mating section and the second mating section, the third insulator extends about the circumference of the first fixed center terminal, the third insulator positions the first fixed center terminal in the fixed outer shell and retains the first fixed center terminal therein.

8. The controlled impedance compressible electrical connector as recited in claim 1, wherein the second movable center terminal has a first mating section and a second mating section, the first mating section is configured to make an electrical connection to the first fixed center terminal.

9. The controlled impedance compressible electrical connector as recited in claim 8, wherein the first mating section is a pin, the second mating section of the second movable center terminal is a female receptacle for receiving an end of a mating contact.

10. The controlled impedance compressible electrical connector as recited in claim 8, wherein the fixed outer shell has a conductive wall and a back wall, the conductive wall and a back wall form a first terminal receiving cavity, the first terminal receiving cavity is dimensioned to receive the first mating section of the second movable center terminal and a portion of the movable outer shell therein, the back wall has an opening which is dimensioned to allow the first mating section of the second movable center terminal to extend therethrough.

11. The controlled impedance compressible electrical connector as recited in claim 8, wherein the movable outer shell includes a first movable outer shell and a second movable outer shell.

12. The controlled impedance compressible electrical connector as recited in claim 11, wherein the first movable outer shell has a tubular configuration with a conductive outer wall, the outer wall has a first terminal receiving portion with a first inside diameter, a second terminal receiving portion with a second inside diameter and a third terminal receiving portion with a third inside diameter, the third inside diameter is larger than the second inside diameter, and the second inside diameter is larger than the first inside diameter.

13. The controlled impedance compressible electrical connector as recited in claim 12, wherein the first terminal receiving portion is configured to receive a second reduced diameter section of the second movable center terminal, the second terminal receiving portion is configured to receive the second reduced diameter section and the second insulator, the third terminal receiving section is configured to receive a portion of the second movable outer shell and the second movable center terminal.

14. The controlled impedance compressible electrical connector as recited in claim 13, wherein the second movable outer shell has a tubular configuration with a conductive outer wall, the outer wall has a first terminal receiving portion with a fourth inside diameter and a second terminal receiving portion with an fifth inside diameter, the fourth inside diameter is slightly larger than the fifth inside diameter, the fifth inside diameter is approximately equal to the third inside diameter of the first movable outer shell.

15. The controlled impedance compressible electrical connector as recited in claim 14, wherein an outer projection is provided on the second movable outer shell to facilitate the proper positioning of the second movable outer shell relative to the first movable outer shell.

16. The controlled impedance compressible electrical connector as recited in claim 15, wherein the resilient member is a spring.

17. The controlled impedance compressible electrical connector as recited in claim 16, wherein the spring extends between the mounting projection of the fixed outer shell and a shoulder of the first movable outer shell of the movable outer shell.

18. A controlled impedance compressible electrical connector for providing an electrical connection between a first mating component and a second mating component, the controlled impedance compressible electrical connector comprising:

a housing with at least one terminal receiving cavity extending therethrough;

a terminal assembly positioned in the at least one terminal receiving cavity, the terminal assembly comprising:

a fixed center terminal;

a movable outer shell, the movable outer shell being movable in the at least one terminal receiving cavity and the housing, the movable outer shell having a first movable outer shell and a second movable outer shell;

a movable center terminal, the movable center terminal extending in the movable outer shell, the movable center terminal moves in unison with the movable outer shell, the relative spacing between the movable center terminal and the movable outer shell being maintained as the movable center terminal and the movable outer shell are moved;

a resilient member provided in the terminal receiving cavity, the resilient member exerting a biasing force on the movable outer shell;

the first movable outer shell has a tubular configuration with a conductive outer wall, the outer wall has a first terminal receiving portion with a first inside diameter, a second terminal receiving portion with a second inside diameter and a third terminal receiving portion with a third inside diameter, the third inside diameter is larger than the second inside diameter, and the second inside diameter is larger than the first inside diameter;

the second movable outer shell has a tubular configuration with a conductive outer wall, the outer wall has a first terminal receiving portion with a fourth inside diameter and a second terminal receiving portion with a fifth inside diameter, the fourth inside diameter is larger than the fifth inside diameter, the fifth inside diameter is approximately equal to the third inside diameter of the first movable outer shell;

wherein the movement of the movable outer shell and the movable center terminal relative to the fixed center terminal and the housing allows the controlled impedance compressible electrical connector to accommodate spacing variations between the first mating component and the second mating component to allow impedance of the electrical connector to be maintained as the movable center terminal and the movable outer shell are moved relative to the fixed center terminal and the housing.

* * * * *